(12) United States Patent
Plante et al.

(10) Patent No.: US 9,609,169 B2
(45) Date of Patent: Mar. 28, 2017

(54) INTERACTIVE DECOR (75) Inventors: Jean-Frederic Plante, San Diego, CA (US); David Edmondson, San Diego, CA (US); Eric G. Wiesner, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1799 days.

(21) Appl. No.: 12/869,871

(22) Filed: Aug. 27, 2010

(65) Prior Publication Data
US 2012/0050816 A1    Mar. 1, 2012

(51) Int. Cl.
G06K 15/00    (2006.01)
H04N 1/405    (2006.01)
H04N 1/32    (2006.01)
G06F 3/03    (2006.01)
G06F 3/0354    (2013.01)
G06K 9/22    (2006.01)

(52) U.S. Cl.
CPC ....... H04N 1/32235 (2013.01); G06F 3/0321 (2013.01); G06F 3/03545 (2013.01); G06K 2009/226 (2013.01); H04N 2201/327 (2013.01); H04N 2201/3271 (2013.01)

(58) Field of Classification Search
None
See application file for complete search history.

(56) References Cited

U.S. PATENT DOCUMENTS

| | | | |
|---|---|---|---|
| 5,059,989 A * | 10/1991 | Eldridge et al. | 347/63 |
| 7,532,366 B1 | 5/2009 | Yang et al. | |
| 7,622,182 B2 | 11/2009 | Wang et al. | |
| 2003/0202045 A1 | 10/2003 | Torgerson et al. | |
| 2005/0243369 A1* | 11/2005 | Goldstein et al. | 358/1.18 |
| 2007/0273917 A1* | 11/2007 | Encrenaz et al. | 358/1.15 |
| 2009/0116074 A1 | 5/2009 | Wilsher | |
| 2009/0303546 A1 | 12/2009 | Silverbrook et al. | |
| 2010/0231631 A1* | 9/2010 | Hosaka | 347/15 |

OTHER PUBLICATIONS

Adnan M. Alattar, "Briding Printed Media and the Internet via Digimarc's Watermark Technology," https://www.digimarc.com/resources/docs/tech_papers/dmrc_bridging_printed_media.pdf, 2009.

* cited by examiner

Primary Examiner — Idowu O Osifade
(74) Attorney, Agent, or Firm — HP Inc. Patent Department

(57) ABSTRACT

Interactive décor and systems and methods of printing an interactive pattern using an inkjet printer are disclosed. An interactive décor may comprise a substrate, and an interactive pattern printed on the substrate. The interactive pattern is addressable using a reader device, but is substantially indiscernible to a naked eye at a viewing distance. A decorative image is printed over the interactive pattern. The decorative image is predominant to the naked eye.

16 Claims, 8 Drawing Sheets

INTERACTIVE DECOR

BACKGROUND

Manufacturers of just about everything are continually looking for ways to enhance and make their products more appealing to their customers. In today's world, interaction with the end-user is a key aspect in new products. For example, the Internet is more than a medium for reading content, providing an interactive environment that allows active participation by its users. Even mobile phones provide more functionality than simply the ability to make and answer phone calls.

One area that has lagged is wall décor. Traditionally, paint and wallpaper and perhaps paintings and pictures have been the primary wall décor available for homes and businesses. But even these offer little by way of an interactive environment.

Museums and other educational venues have struggled to provide more interactive environments for their patrons to enhance their experience. Typically, these venues have provided buttons that their patrons can press at the display to activate a light or sound in the display. More recently, some venues have begun providing their patrons with audio tracks that correspond to different displays the patrons will encounter as they walk through the venue. Typically, the patrons have to carry a wand (or similar device) that is activated automatically when the patron nears a particular display, and plays audio corresponding to the display the patron is standing near. These interactive environments are typically reserved for large public venues.

Figure 1:
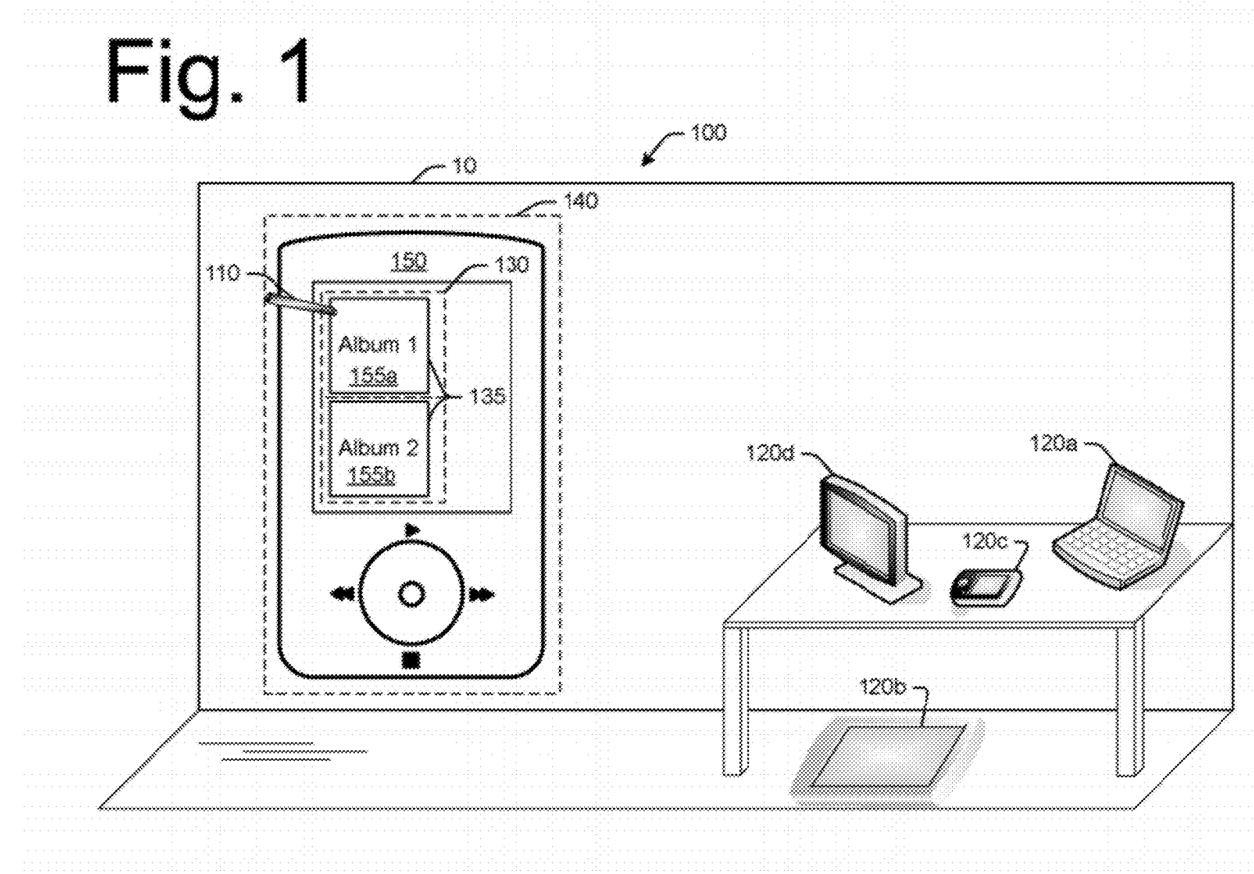
FIG. 1 is a high-level illustration of an exemplary interactive décor and reader device showing the reader device causing actions at other devices.

DETAILED DESCRIPTION interactive décor is disclosed herein (e.g., which may be used as wallpaper) to enable homeowners and professionals and others to print decorative images with interactive zones. FIG. 1 is a high-level illustration of an exemplary interactive décor 100 and reader device 110 showing the reader device 110 causing actions at the reader device 110 and/or at other devices 120a-d. One or more interactive pattern 130 may be embedded in all or part of a decorative image 140 to form one or more interactive zones 135. The interactive pattern 130 may be partly or wholly substantially indiscernible to a naked eye at a viewing distance so that the decorative image 140 is seen, while the interactive pattern 130 is only recognized using the reader device 110 or other suitable device. The reader device 110 is programmed to cause one or more actions to occur on the reader device 110 itself and/or at one or more remote location when the reader device 110 is positioned adjacent the interactive zone(s) 135. Remote location(s) may include, by way of example but not limited to, other devices such as a computer 120a, tablet device 120b, mobile phone 120c, or display 120d.

For purposes of illustration, a wall 10 may be partly or entirely covered with what appears to the naked eye to be a typical wallpaper having an image of a large MP3 player 150 "displaying" songs or music albums 155a-b. The wallpaper is actually the interactive décor 100 including a plurality of interactive zones 135. In the illustration shown in FIG. 1, separate interactive zones 135a-b are formed to coincide with each album cover 155a-b, respectively. When a user positions the reader device 110 adjacent "Album1" 155a shown on the image of the MP3 player 150, one or more songs or music plays through a speaker. The speaker may be provided on the reader device 110 and/or elsewhere in the room. For example, the reader device 110 may cause the song(s) or music to play through speakers on the computer 120a. When the user moves the reader device adjacent "Album2" 155b shown on the image of the MP3 player 150, a different song or music plays through the speaker(s).

Of course there are limitless possibilities for using the interactive patterns 130 with different decorative images 140, as will be readily appreciated by those having ordinary skill in the art after becoming familiar with the teachings herein. By way of illustration, other examples may include games and educational applications. For example, the decorative image 140 may include a map and audio may play through speakers on the reader device 110 to identify geographic locations as the user points to different locations on the map. Still other examples may include an image of an alarm clock on the wall décor, where the user can turn on or off an alarm on the computer 120a or mobile phone 120c by pointing the reader device "on/off" buttons in the image of the alarm clock on the decorative image 140.

Figure 2:
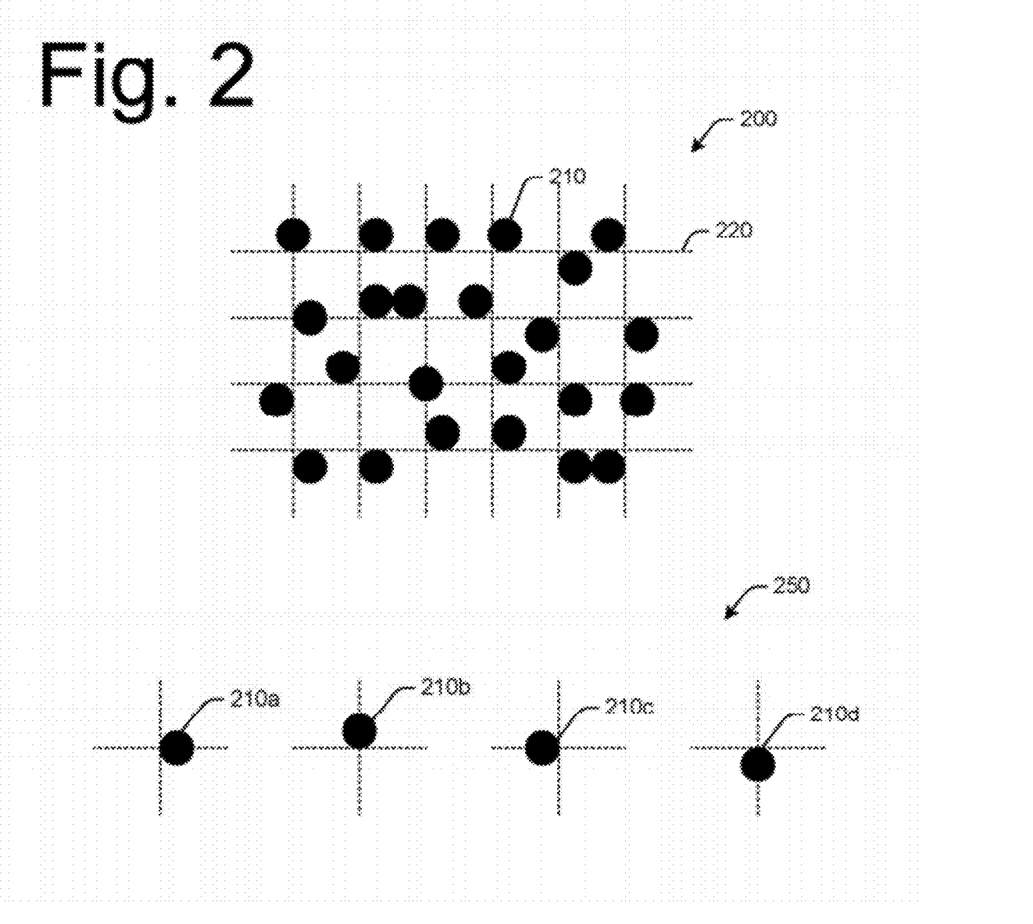
FIG. 2 is a magnified view of an exemplary interactive pattern.

FIG. 2 is a magnified view of an exemplary interactive pattern (e.g., the interactive pattern 130 in FIG. 1). As an example, the interactive pattern shown in FIG. 2 may be an Anoto pattern 200. Anoto patterns 200 may be printed on any suitable substrate (e.g., ordinary paper or wallpaper). A plurality of "dots" 210 are printed on the substrate in a predetermined arrangement to make the interactive zones 135 digitally legible to the reader device 110 shown in FIG. 1.

A close-up view 250 of a portion of the Anoto pattern 200 shows the placement of each dot 210a-d relative to a grid 220. The grid 220 may be about 0.2 to 0.5 millimeters square, although other dimensions are also contemplated. In the illustration shown in the close-up view 250, dot 210a is shown to the right of the grid 220a; dot 210b is shown above the grid 220b; dot 210c is shown to the left of the grid 220c; and dot 210d is shown below the grid 220d.

It is noted that placement of the dots 210a-d shown in the close-up view 250 is exemplary of one embodiment, and is not intended to be limiting to the interactive pattern 200 in any way. For example, a dot 210 may be positioned such that the dot 210 is both to the right of the grid and above the grid. It is also noted that the "grid" 220 shown in FIG. 2 is provided only as a visual reference herein, and need not be used in the actual printing process.

The dots 210 are printed in such a manner (e.g., sufficiently small and spaced apart from one another) that the Anoto pattern 200 appears substantially indiscernible to a naked eye at a viewing distance. But the specific size, placement and/or spacing of the dots 210 forms a pattern that, when read by the reader device 110 (FIG. 1) using a suitable image recognition algorithm, indicates the position of the reader device 110 in the Anoto pattern 200 and hence relative to the wall 10 shown in FIG. 1. Accordingly, the Anoto pattern 200 indicates one or more interactive zones 135 (FIG. 1) that can be associated with one or more action (e.g., playing music in the illustration discussed above).

Although described above with reference to a particular type of pattern, e.g., the Anoto pattern 200, it will be readily appreciated by those having ordinary skill in the art that the interactive pattern 130 (FIG. 1) need not be implemented using an Anoto pattern 200. Other suitable interactive patterns 130 may also be used to provide the interactive zones 135 described herein.

Figure 3:
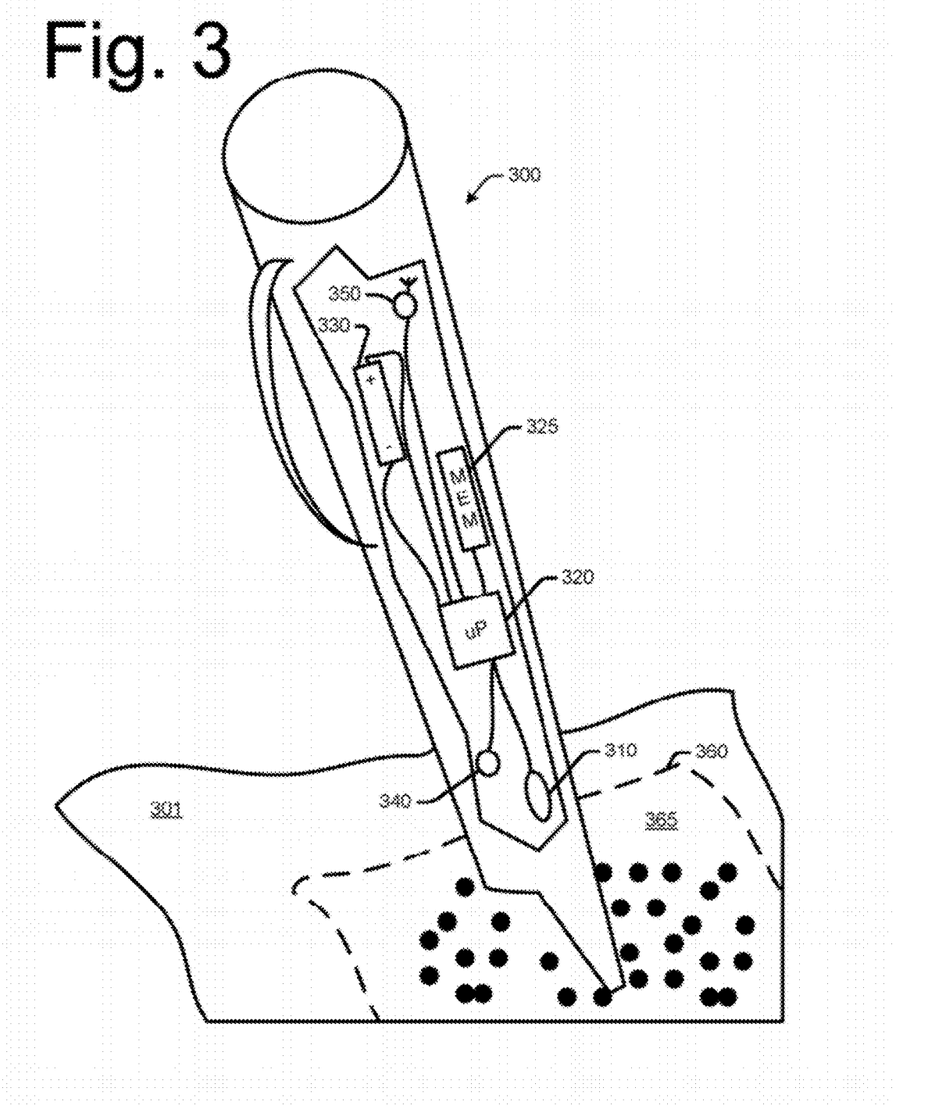
FIG. 3 shows an exemplary reader device.

FIG. 3 shows an exemplary reader device (e.g., the reader device 110 in FIG. 1). As an example, the reader device shown in FIG. 3 may be an Anoto reader 300, also referred to commercially as a "digital pen" because it looks and feels like a typical ballpoint pen. It is noted that FIG. 3 is illustrative and not to scale. In particular, the dots shown in FIG. 3 are much smaller than shown relative to the size of the Anoto reader 300.

The Anoto reader 300 includes a digital camera 310, a microprocessor 320 and associated memory 325, battery 330, one or more sensors 340, and a networking device 350 (e.g., a Bluetooth transceiver) for establishing a wireless connection with other devices (e.g., the devices 120*a-d* shown in FIG. 1). In use, digital images of the interactive pattern (e.g., the Anoto pattern 200 shown in FIG. 2) are captured by the optical reader 310 (e.g., at a rate of about 50 images per second) when the Anoto reader 300 is positioned in the vicinity or adjacent to an interactive zone 360 including an interactive pattern 365 on the substrate 301 (e.g., the wallpaper or other décor). The image includes sufficient data, that when processed using a suitable image recognition algorithm (e.g., stored in memory 325 and executed by processor 320), can be used to identify the position of the Anoto reader 300 relative to the wall décor.

The position data may be stored in memory 325 (e.g., as coordinates). The position data may then be used to cause a corresponding action at the Anoto reader 300 itself (e.g., playing music through a speaker provided in the Anoto reader 300) and/or transmitted via wireless link 350 to another device (e.g., the devices 120*a-d* shown in FIG. 1) to cause a corresponding action (e.g., playing music through a speaker at the computer 120*a*).

Other information may also be collected by the reader device (e.g., sensors 340 and stored in memory 325, such as, the time and temperature. Other information may be used to cause different actions in the same interactive zones based on this other information. By way of illustration, in the music player example discussed above with reference to FIG. 1, different music may play for the same interactive zone labeled "Album1" depending on the time of day. Or for example, the alarm clock may be louder or softer depending on the room temperature. Any of a wide variety of different combinations may be implemented, and these are provided herein only as examples.

Although described above with reference to a particular type of reader device, e.g., the Anoto reader 300, it will be readily appreciated by those having ordinary skill in the art that the reader device 110 (FIG. 1) need not be implemented using an Anoto reader 300. Other suitable reader devices 110 may also be used to provide the interactive zones 135 described herein. Likewise, the reader device need not take any particular configuration (e.g., a pen) and may be packaged as a wand, flashlight, ball, and the like. Indeed, conventional devices such as a user's mobile phone may also be programmed to function as the reader device.

Also described herein are systems and methods to enable printing of the interactive pattern using an inkjet printer. The printing process may be substantially comparable to a standard printing process in both speed and ability to print complex images, while maintaining the simplicity of a standard printing workflow. In one example, the interactive pattern may be printed with a certain degree of accuracy such that the interactive pattern (e.g., the Anoto pattern 200) can be identified or addressed with the reader device (e.g., the Anoto reader 300) using a suitable image recognition algorithm. The decorative image may be printed over the interactive pattern in such a manner so as to not hinder recognition of the interactive pattern using the reader device, while preserving the overall appeal of the decorative image.

In one example, the decorative image is printed using a technique known as half-toning. Half-toning simplifies errors that could occur using two-pass printing when using a normal printing path. Half-toning also enables more degrees of freedom in the interactive zone, in both a spatial location and an interactive zone. In addition, the initial image does not need to be separately processed to embed the interactive pattern.

Figure 4:
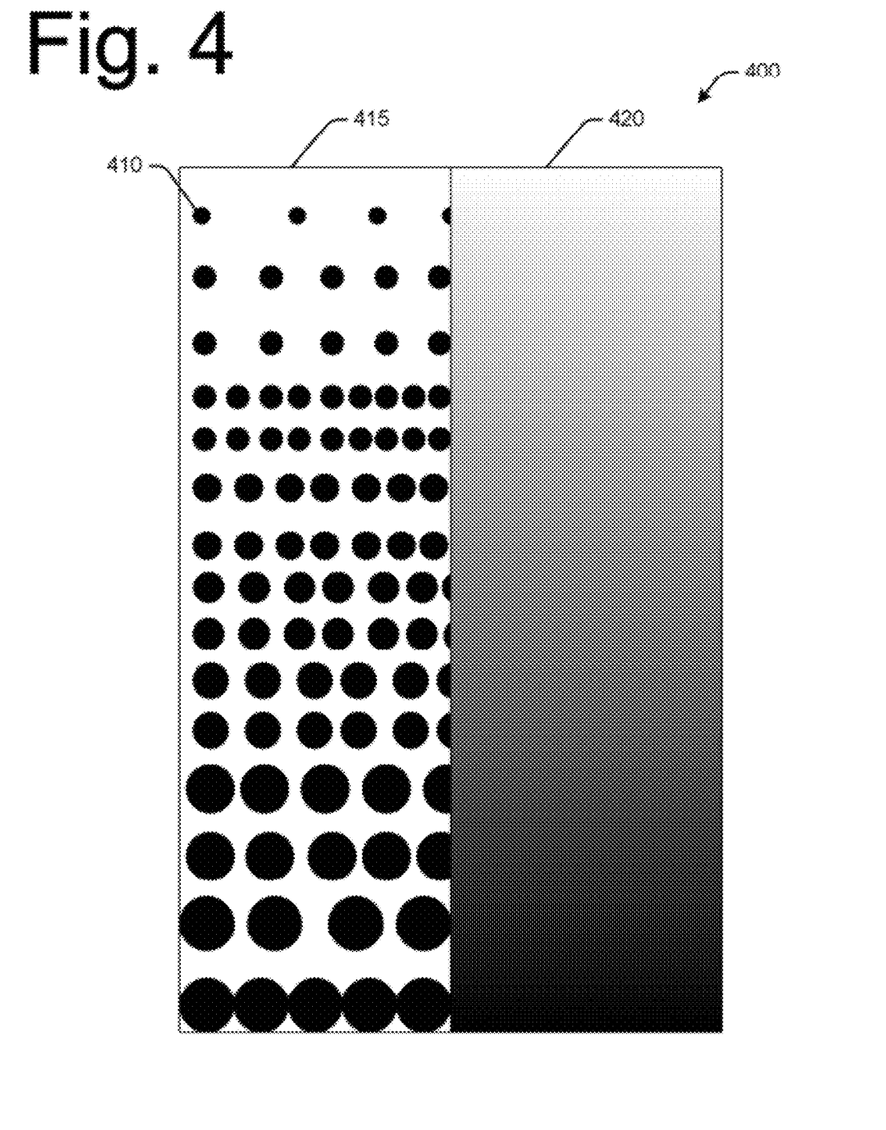
FIG. 4 illustrates exemplary half-toning.

FIG. 4 illustrates exemplary half-toning. Half-toning is a well-known reprographic technique that generates a half-tone image 400 using many small "dots" 410. The dots 410 can only be seen in magnified form 415. The dots 410 may vary in size and/or placement or spacing. When viewed by the naked eye at a suitable distance, these dots 410 simulate the appearance of a continuous tone 420. Before continuing, it is noted that the dots 410 are not to be confused with the dots used to generate the interactive pattern (e.g., the dots 210 in the Anoto pattern 200). It is also noted that the magnified form 415 is merely illustrative and not to scale. The dots 410 shown in magnified form 415 are much smaller and therefore do not correspond one-for-one to the continuous tone 420 shown beside the magnified form 415.

The simulation of a continuous tone 420 is an optical illusion to the naked eye, giving the appearance that the dots 410 have been blended together to form a smooth, continuous tone 420. That is, half-toning uses a high frequency/low frequency dichotomy. The low frequency attribute is a local area of the output image referred to as a half-tone cell. Each equal-sized cell relates to a corresponding area (size and location) of the continuous-tone input image. Within each cell, the high frequency attribute is a centered variable-sized half-tone dot. The ratio of the dot area to the empty area corresponds to the luminance of the input cell. Accordingly, when viewed from a suitable distance the naked eye averages both the high frequency and the low frequency cells giving the appearance of a continuous tone 420.

It is noted that some processes (e.g., thermal inkjet printing) does not utilize variable drop size. In such processes, half-toning may still be implemented by varying the number of dots in a halftone cell.

To help distinguish the interactive pattern from the decorative image, different half-toning (e.g., dot size and placement) may be used to print the interactive pattern than is used to print the decorative image. The printing technique used to print the decorative image repeats the halftone process for each subtractive color. This is typically accomplished using what is referred to as a CMYK color model, where C is cyan, M is magenta, Y is yellow, and K is black. Accordingly, the decorative image may be moved to the CMY space, and the interactive pattern may be moved onto the K plane.

In one example, the decorative image is converted from a CMYK to a CMY matrix, thereby translating the decorative image into a CMY-only raster image. The interactive pattern is generated as a K dot image. Then the interactive pattern and the converted decorative image are merged for printing using a half-toning process that merges the K dot image and the CMY-only raster image in such a way that the interactive pattern is still addressable by the reader device, while remaining substantially indiscernible to a naked eye at a viewing distance so that only the decorative image is seen.

In addition to half-toning, it is noted that the semi-opaque property of ink also enables the interactive pattern to be addressable by the reader device even if the decorative image is printed over all or some of the dots comprising the interactive pattern. That is, the combination of CMY may be used to produce black in the decorative image, while carbon black ink K may be used to produce black in the interactive pattern. Because there is no carbon black in the CMY color space, the black in the interactive pattern "shows through" the colors in the decorative image, even black in the decorative image because this black was formed using CMY instead of carbon black K.

Other embodiments are also contemplated. For example, the interactive pattern may be printed using an ultra-violet (UV) only visible ink; an ink that is only visible in the UV spectrum (e.g., using a UV reader device). Still other examples will be readily apparent to those having ordinary skill in the art after becoming familiar with the teachings herein.

Figure 5:
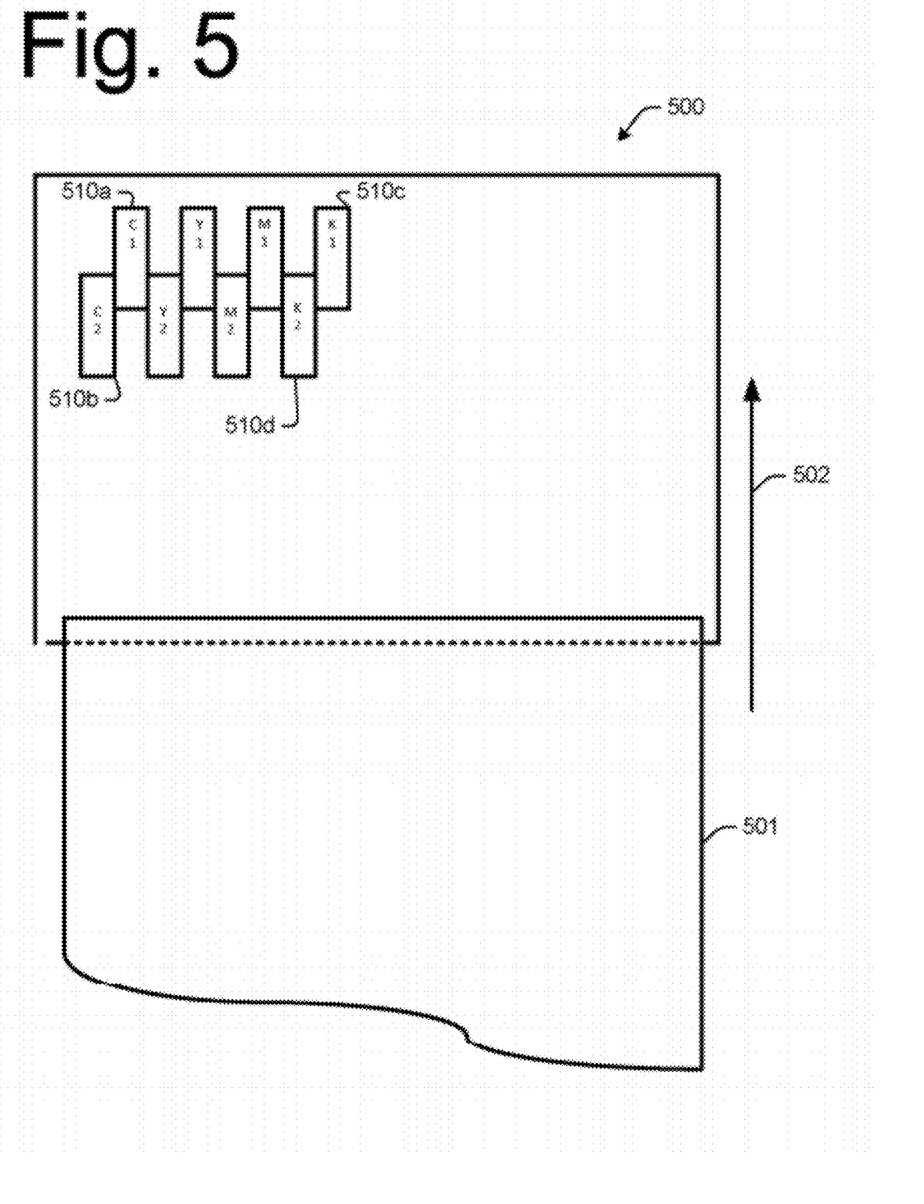
FIG. 5 show an exemplary printer system which may be implemented for generating an interactive décor.
Figure 5A:
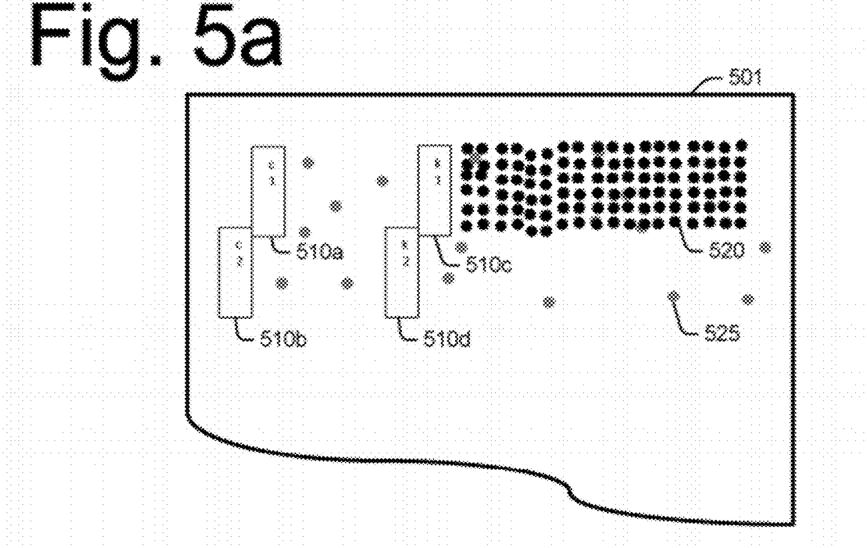
FIGS. 5a-d illustrate the decorative image and the interactive pattern being printed substantially simultaneously.
Figure 5B:
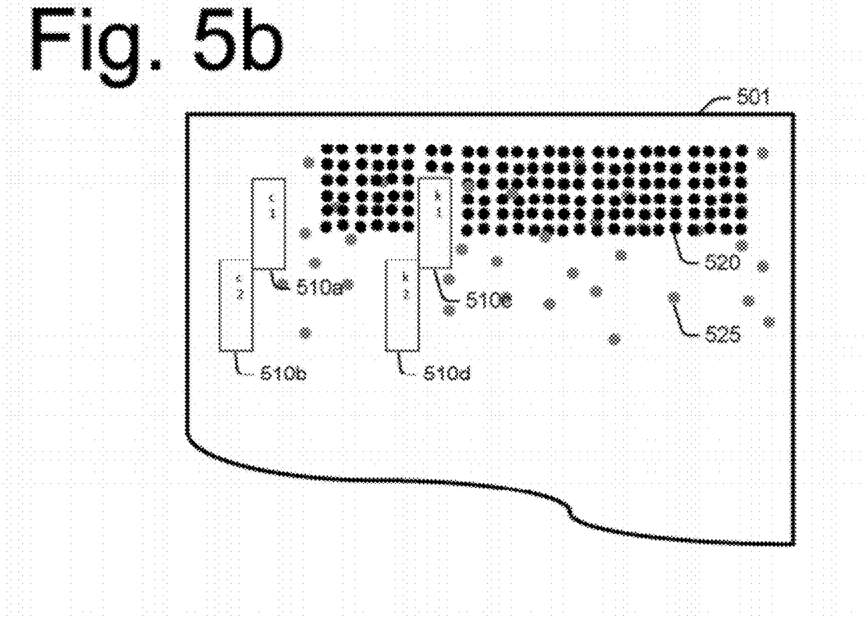
Figure 5C:
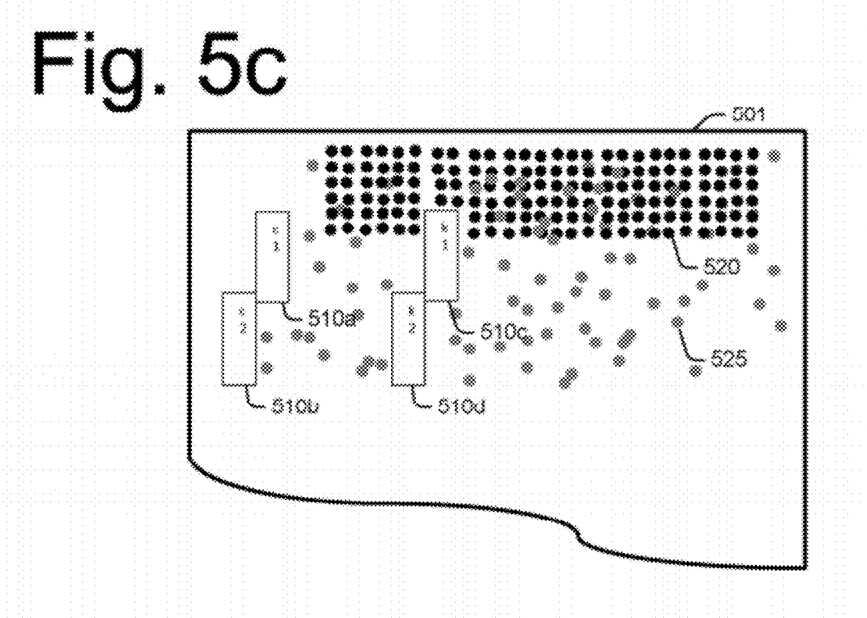
Figure 5D:
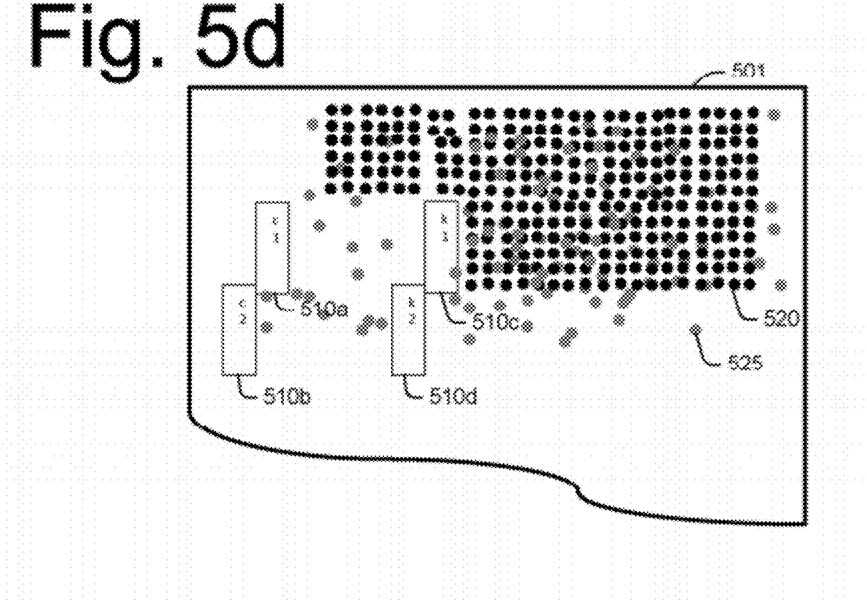

FIG. 5 shows an exemplary printer system 500 which may be implemented for generating an interactive décor. In this example, a commercially available Hewlett-Packard L25500 inkjet printer may be used, including four printheads 510a-d. For purposes of simplicity, printheads 510a-b represent C (cyan ink) and printheads 510c-d represent K (carbon black ink). The printer also includes other printheads for M (magenta ink) and Y (yellow ink). Also shown in FIG. 5 is the media 501 (e.g., paper or other substrate) and the media path 502.

Dot placement issues that may arise during printing may be addressed by avoiding dot-on-dot printing, and relying on printhead nozzle placement accuracy rather than media advance through the printer system 500. While slow scan axis speeds may be implemented on the printer system 500 to improve dot placement accuracy, this technique may result in poor image quality and poor gamut.

It is noted that the print nozzle need not fire contiguously. In another example where a 0.3 mm grid is used for purposes of illustration, every fourteenth nozzle of a 1200 dots per inch (dpi) printhead would fire. Because the Anoto pattern is based on relative position of the dots, the pattern is robust enough to accommodate for nozzle variation even if some of the nozzles are not used.

Instead, printing the interactive pattern may be separated from printing of the decorative image. This can be accomplished by printing the interactive pattern first, rewinding the media, and then printing the decorative image by resuming traditional workflow to preserve image quality. Alternatively, this can be accomplished by printing the interactive pattern substantially simultaneously with the decorative image.

Before continuing, it is noted that the interactive pattern should be printed using a single pass print mode. Although a single pass print mode may magnify media advance error, the error only occurs on a small portion of the interactive pattern and therefore does not hinder pattern recognition using the reader device. In addition, only contiguous healthy print nozzles should be used. This aids in relocating errors to some spaced lines along the paper axis.

FIGS. 5a-d illustrate the decorative image and the interactive pattern being printed substantially simultaneously. It is noted that for purposes of simplifying the drawings, the printheads for Y and M are not shown in FIGS. 5a-d. Before printing, the healthiest contiguous sections of the available black pens are detected. These are used to print the interactive pattern. Next, the decorative image is sent to the printer with a print job file specifying which portion of the decorative image to associate with the "address range" of the interactive pattern.

A pattern generation module (e.g., provided in the printer firmware or other program code) may be implemented to generate a K dot image of the interactive pattern. The interactive pattern may include the entire decorative image or specific portions of the decorative image. Next, a CMYK to CMY matrix may be implemented to translate decorative image into a CMY-only raster image. Half-toning may be used to merge the interactive pattern and the decorative image.

In FIGS. 5a-d the interactive pattern is printed together with the decorative image in a three-pass print mode (or six-pass print mode if using a staggered printhead as a referential) using the full swath of the top pen in a printing system have two staggered printheads. Accurate color matching is accomplished by sending a CMYK color target to the printing path of the interactive pattern, and creating an ICC. Accordingly, the K and CMY merge operation is achieved.

During the first pass of the printheads (FIG. 5a), the printhead 510c (black ink) and both of the color printheads (top and bottom C1M1Y1 and C2M2Y2) are actuated to print the dots 520 representing the interactive pattern. Then the media 501 is advanced 1/3 pass (e.g., in the direction illustrated by arrow 502 in FIG. 5). It is noted that the 1/3 advance refers to an example 3-pass printing (or 6-pass printing if the swath height is considered to include both printheads).

During the second pass of the printheads (FIG. 5b), only the printhead 510a (cyan ink) is actuated to print the half-tone dots 525 representing the decorative image. Then the media 501 is advanced 1/3 pass again (e.g., in the direction illustrated by arrow 502 in FIG. 5). During the third pass of the printheads (FIG. 5c), only the printhead 510a (cyan ink) is actuated to print the half-tone dots 525 representing the decorative image. Then the media 501 is advanced 1/3 pass again (e.g., in the direction illustrated by arrow 502 in FIG. 5). During the fourth pass of the printheads (FIG. 5c), only the printhead 510c (black ink) is actuated to print the dots 520 representing the interactive pattern.

It is noted that there may be some registration error aligning the first swath of the interactive pattern with the second swath of the interactive pattern. It is noted, however, that registration errors are much preferable to systematic dot placement errors. For example, the image recognition algorithm in the reader may be sufficiently robust and/or calibrated to adjust for registration error, if any, between swaths.

Figure 6:
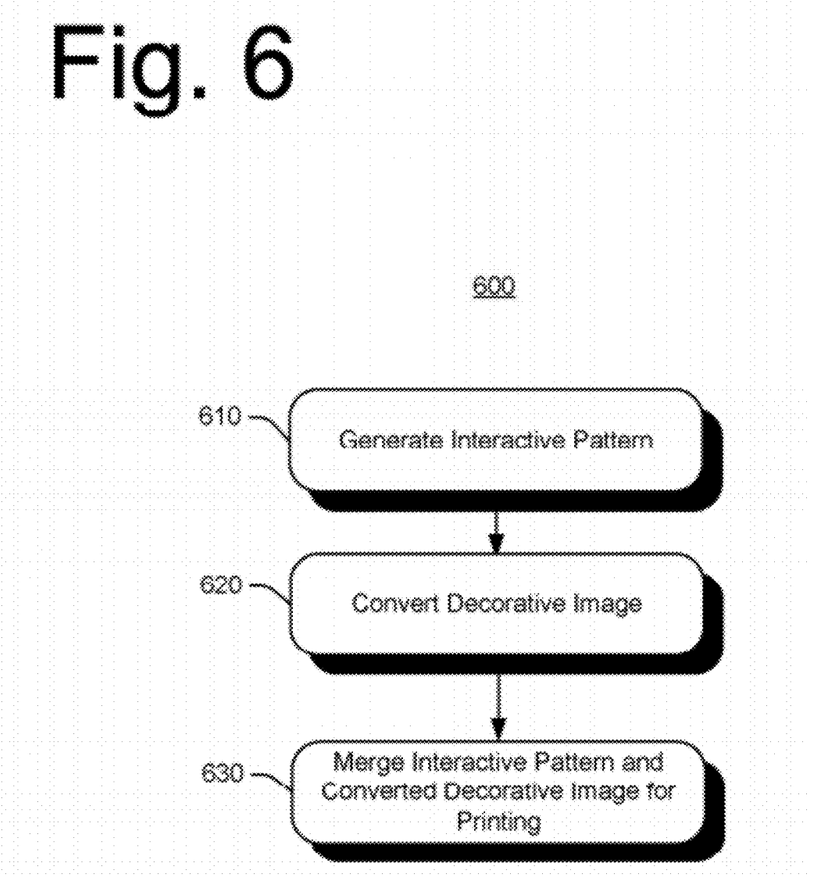
FIG. 6 is a flowchart illustrating exemplary operations which may be implemented for printing an interactive pattern using an inkjet printer.

FIG. 6 is a flowchart illustrating exemplary operations which may be implemented for printing an interactive pattern using an inkjet printer. Operations 600 may be embodied as logic instructions (e.g., software, firmware, or other program code) on one or more computer-readable medium. When executed on a processor (e.g., in a printer or a computer operatively associated with the printer), the logic instructions cause a general purpose computing device to be programmed as a special-purpose machine that implements the described operations. In an exemplary implementation, the components and connections depicted in the figures may be used.

In operation 610, an interactive pattern is generated in program code. For example, an anoto pattern generation module may be provided in the printer firmware, and generates a K dot image of the anoto layer based on the zones and addressable range specified. The zones may be the entire image area, or a portion thereof.

In operation 620, a decorative image is converted. For example, a CMYK to CMY matrix may be used to translate the decorative image into a CMY-only raster image.

In operation 630, the interactive pattern and the converted decorative image are merged for printing. For example, an anoto halftoning process may merge the K dot image and the CMY-only raster image in such a way that the anoto pattern can be addressed by the reader device while remaining substantially indiscernible to a naked eye at a viewing distance; so that the decorative image is predominant to the naked eye.

The operations shown and described herein are provided to illustrate exemplary implementations of printing an interactive pattern using an inkjet printer. It is noted that the operations are not limited to the ordering shown. Still other operations may also be implemented.

It is noted that the exemplary embodiments shown and described are provided for purposes of illustration and are not intended to be limiting. Still other embodiments are also contemplated for providing interactive patterns and for printing interactive patterns using inkjet printers.

The invention claimed is:

1. An interactive décor comprising:
   a substrate;
   a plurality of separate interactive zones, each of the interactive zones corresponding to a different executable action when addressed by a reader device;
   an interactive pattern in each of the interactive zones, the interactive pattern printed on the substrate, the interactive pattern addressable using the reader device but substantially indiscernible to a naked eye at a viewing distance;
   a decorative image printed over the interactive pattern, the decorative image being predominant to the naked eye, and the interactive pattern covered by the decorative image still addressable using the reader device,
   wherein the action is executed in response to a combination of the reader device detecting the interactive pattern and the reader device collecting other information, wherein a different action is executed in a same one of the interactive zones based on the other information, and wherein the other information is at least one of time and temperature.

2. The interactive décor of claim 1, wherein the interactive pattern is printed using a different halftoning than the decorative image so that the interactive pattern covered by the decorative image is still addressable using the reader device.

3. The interactive décor of claim 1, wherein the decorative image is printed in CMY space.

4. The interactive décor of claim 1, wherein the interactive pattern is printed on a K plane or using an UV-only visible ink.

5. The interactive décor of claim 1, wherein the reader device executes the action in response to detecting the interactive pattern.

6. The interactive décor of claim 1, wherein the reader device causes another device to execute the action in response to detecting the interactive pattern.

7. A method comprising:
   identifying a plurality of separate interactive zones, each of the interactive zones corresponding to a different executable action when addressed by a reader device;
   generating an interactive pattern in program code for each of the interactive zones;
   converting a decorative image; and
   merging the interactive pattern and the converted decorative image for printing,
   wherein the action is executed in response to a combination of the reader device detecting the interactive pattern and the reader device collecting other information, wherein a different action is executed in a same one of the interactive zones based on the other information, and wherein the other information is at least one of time and temperature.

8. The method of claim 7, further comprising generating a K dot image of an anoto layer for the interactive pattern.

9. The method of claim 7, further comprising converting the decorative image from a CMYK image to a CMY-only raster image.

10. The method of claim 7, further comprising merging the interactive pattern and the converted decorative image so that the printed decorative image is predominant to the naked eye.

11. The method of claim 7, further comprising preserving an anoto pattern for addressing by the reader device during merging of the interactive pattern and the converted decorative image.

12. A printer system for generating an interactive décor, comprising non-transitory computer-readable storage for storing program code, the program code executable by a processor to:
   generate an interactive pattern for each of a plurality of separate interactive zones, each of the interactive zones corresponding to a different executable action when addressed by a reader device;
   convert a decorative image to a raster image;
   merge the interactive pattern and the raster image of the decorative image for printing the decorative image over the interactive pattern,
   wherein the decorative image is predominant to the naked eye,
   wherein the interactive pattern is addressable using the reader device but is otherwise substantially indiscernible to a naked eye at a viewing distance,
   wherein the action is executed in response to a combination of the reader device detecting the interactive pattern and the reader device collecting other information, wherein a different action is executed in a same one of the interactive zones based on the other information, and wherein the other information is at least one of time and temperature.

13. The printer system of claim 12, wherein the interactive pattern is a K dot image of an anoto layer.

14. The printer system of claim 12, wherein the decorative image is converted from a CMYK image to a CMY-only raster image.

15. The printer system of claim 12, wherein the interactive pattern is printed using different halftoning than is used to print the decorative image.

16. The printer system of claim 12, wherein the interactive pattern and the decorative image are both printed on the substrate simultaneously using staggered print heads.

\* \* \* \* \*

UNITED STATES PATENT AND TRADEMARK OFFICE
CERTIFICATE OF CORRECTION

PATENT NO. : 9,609,169 B2
APPLICATION NO. : 12/869871
DATED : March 28, 2017
INVENTOR(S) : Jean-Frederic Plante et al.

It is certified that error appears in the above-identified patent and that said Letters Patent is hereby corrected as shown below:

In Column 8, Line 22 approx., in Claim 8, delete "anoto" and insert -- Anoto --, therefor.

In Column 8, Line 31 approx., in Claim 11, delete "anoto" and insert -- Anoto --, therefor.

In Column 8, Line 61 approx., in Claim 13, delete "anoto" and insert -- Anoto --, therefor.

Signed and Sealed this
Thirteenth Day of June, 2017

Joseph Matal
*Performing the Functions and Duties of the
Under Secretary of Commerce for Intellectual Property and
Director of the United States Patent and Trademark Office*